No. 793,606. PATENTED JUNE 27, 1905.
F. C. OSBORN.
COMPUTING SCALE.
APPLICATION FILED JAN. 19, 1905.

5 SHEETS—SHEET 1.

WITNESSES.
C. H. Walker.
A. A. Ege.

INVENTOR
Francis C. Osborn
By Fisk & Jomas
Attorneys

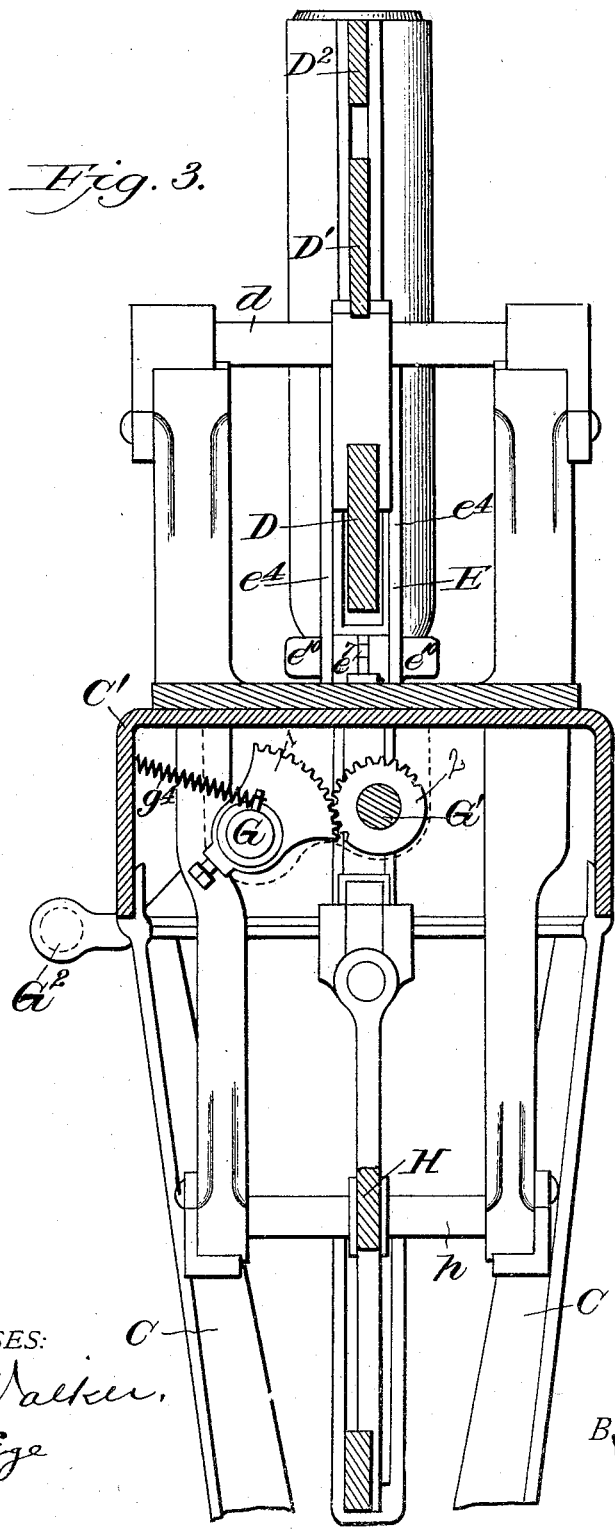

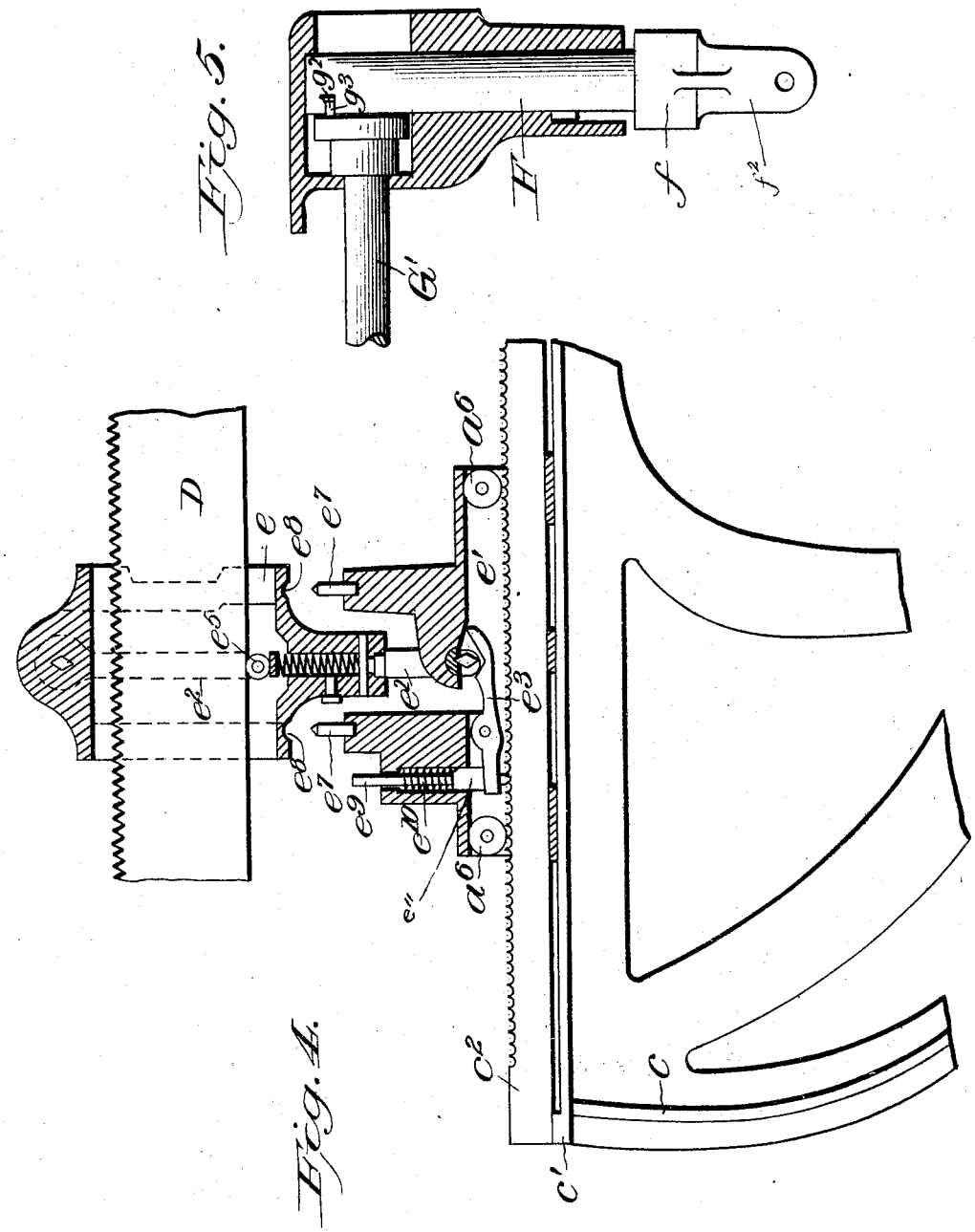

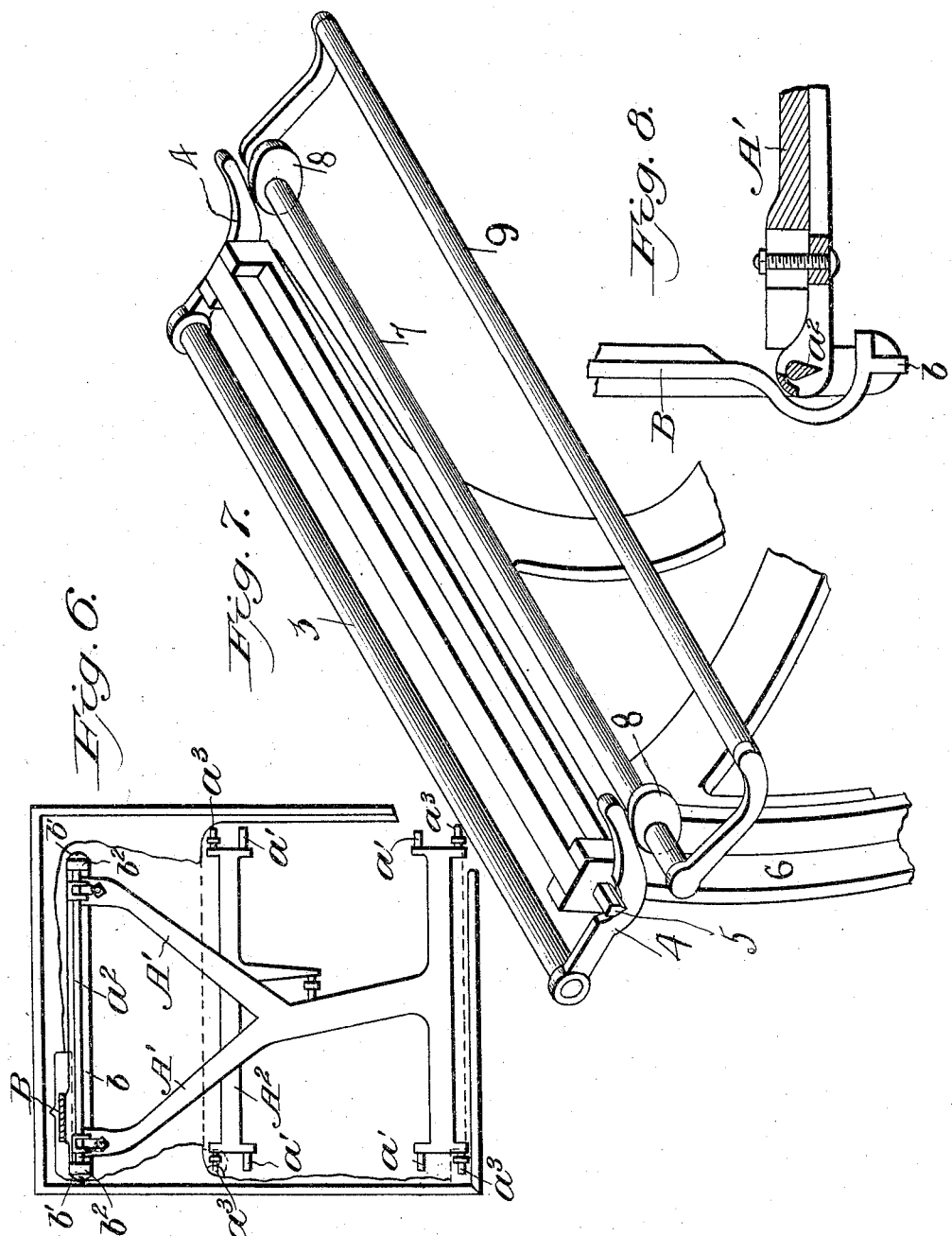

No. 793,606. Patented June 27, 1905.

UNITED STATES PATENT OFFICE.

FRANCIS C. OSBORN, OF DETROIT, MICHIGAN, ASSIGNOR, BY DIRECT AND MESNE ASSIGNMENTS, TO THE STANDARD COMPUTING SCALE COMPANY, LIMITED, OF DETROIT, MICHIGAN, AN ASSOCIATION ORGANIZED UNDER THE LAWS OF MICHIGAN.

COMPUTING-SCALE.

SPECIFICATION forming part of Letters Patent No. 793,606, dated June 27, 1905.

Original application filed January 26, 1899, Serial No. 703,412. Divided and this application filed January 19, 1905. Serial No. 241,749.

*To all whom it may concern:*

Be it known that I, FRANCIS C. OSBORN, a citizen of the United States, residing at Detroit, county of Wayne, State of Michigan, have invented a certain new and useful Improvement in Computing-Scales; and I declare the following to be a full, clear, and exact description of the invention, such as will enable others skilled in the art to which it pertains to make and use the same, reference being had to the accompanying drawings, which form a part of this specification.

My invention relates to what are known as "computing" or "price" scales wherein provision is made for weighing pounds and ounces for the tare, for the rate or price per pound, and for the total value of the article or commodity being weighed.

One object of the invention is to overcome the necessity for moving the rate and value beams in order to change the point of application of the weight to the value-beam.

Another object of the invention resides in the construction and arrangement of a scale of the type named wherein the connecting-block is made movable and the point of application of the weight thereby changed as distinguished from that class of scales wherein the connecting-block is fixed and the point of application changed by moving the beam.

A still further object of the invention is to simplify the scales of this type and to so mount the various elements that they may cooperate accurately in the weighing of articles or commodities simultaneously with the indication of the price per pound and the total value.

With these and other objects in view the present invention consists in the combination and arrangement of parts, as will be hereinafter more fully described, shown in the accompanying drawings, and particularly pointed out in the appended claims, it being understood that changes in the form, proportion, size, and minor details may be made within the scope of the claims without departing from the spirit or sacrificing any of the advantages of the present invention.

Figure 1:
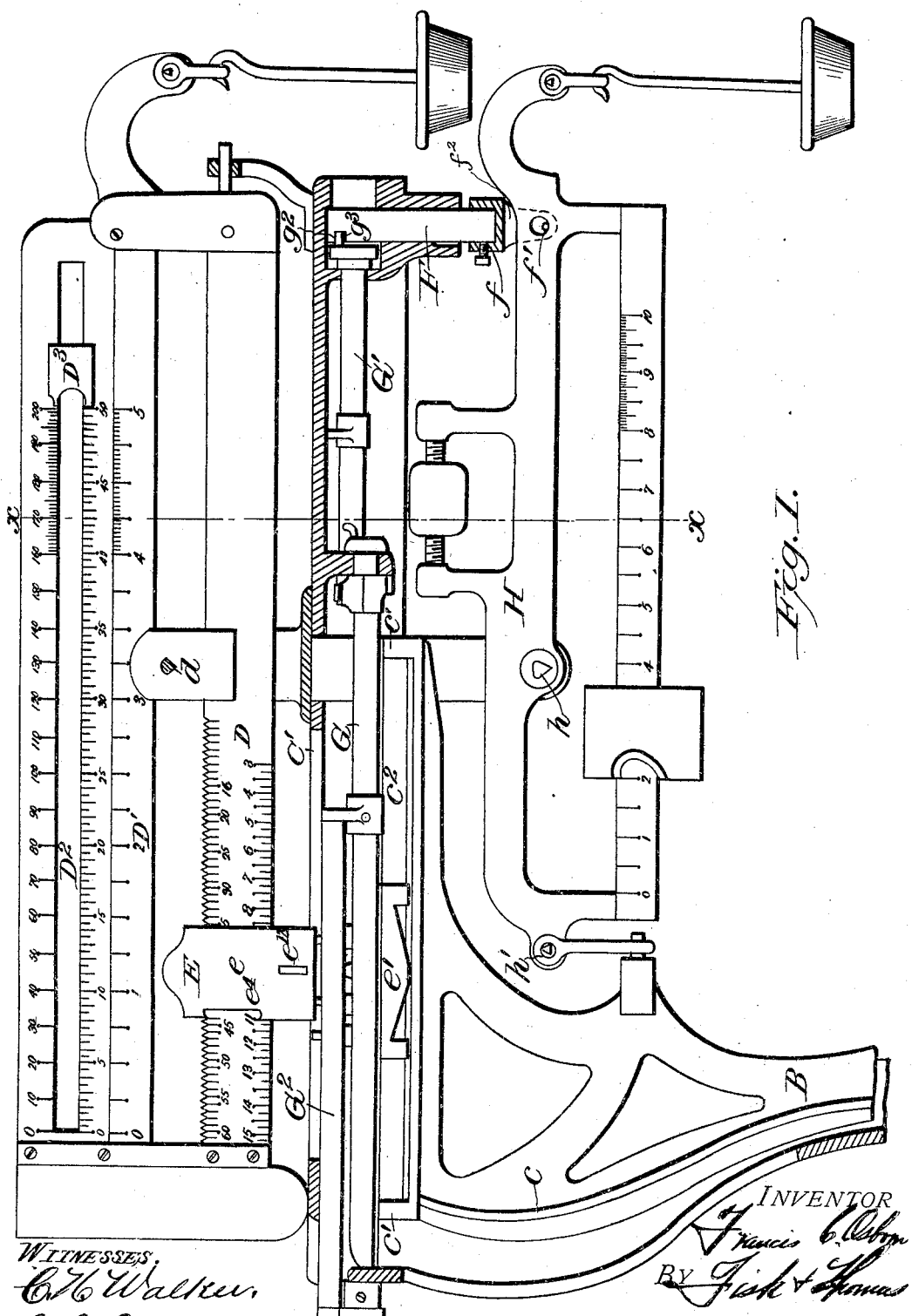
Figure 2:
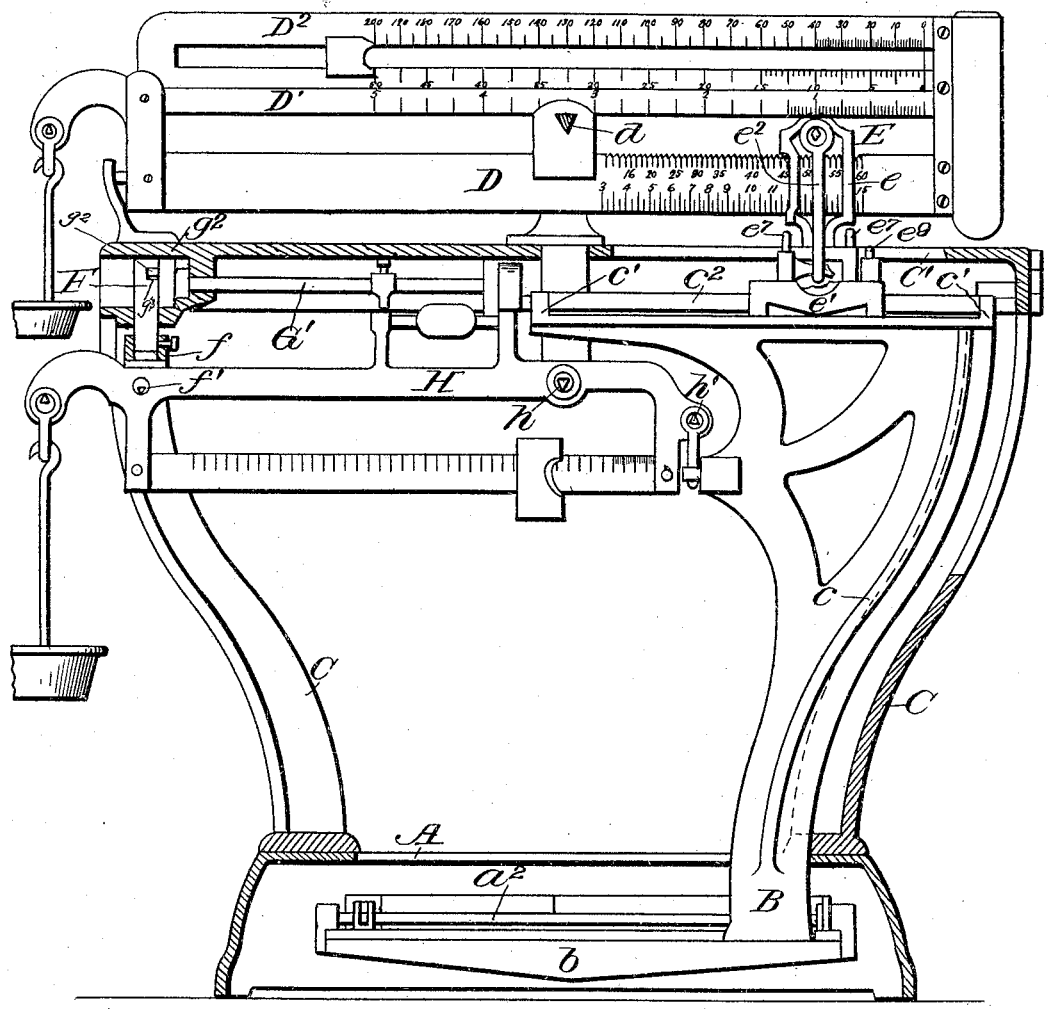

In the drawings, Figure 1 is a front elevation of the upper portion of the scale, parts being in section. Fig. 2 is a rear elevation illustrating a similar view with the parts also in section. Fig. 3 is a cross-sectional view looking to the left from the line $x\ x$ in Fig. 1. Fig. 4 is a sectional view of the movable connecting-block through which the weight is applied with variable leverage to the combined weight and value beams. Fig. 5 is a detail view illustrating the mounting of one end of the operating-bar and also the means employed for lifting the connecting-block out of engagement with the rate-beam. Fig. 6 is a plan view of the platform-levers in the base of the scale. Fig. 7 is a detail view illustrating a variation in the means employed for lifting the connecting-block, through the instrumentality of which the connecting-block is lifted out of engagement with the rate-beam without using the tare-beam as a lever; and Fig. 8 is a detail sectional view of the connection between the connecting-frame and platform-levers, showing adjustable connections.

Referring now more specifically to the accompanying drawings, the reference character A indicates the base of the scale, within which are mounted on knife-edges the bifurcated platform-lever $A'$ and the cross-lever $A^2$. The knife-edges on which the platform-levers just alluded to are supported are shown at $a^3$, and the knife-edges which support the platform on the levers are shown at $a'$. The construction of these platform-levers is quite similar to the construction heretofore employed except that the lever $A'$ is bent a greater distance than heretofore to bring the point of application of the arm to the left outside of the point from which the connecting-frame rises, and it has an additional corresponding arm at the right, making it a bifurcated lever, as clearly shown in Fig. 6. The character B indicates a vertical "connecting-frame," so called to distinguish it from the vertical connecting-rod commonly used in these devices. It will be observed that this frame constitutes the means employed for transmitting the result of the weight on the platform-levers to beams above and for this purpose corresponds with the connecting-rods heretofore employed. To provide for connecting the lower portion of this frame with the arms of the lever A', this portion is extended horizontally, as shown at $b$, within the base, and it extends in either direction beyond the ends of the arms of the bifurcated lever A'. A rod $a^2$ is rigidly but adjustably supported on the outer ends of the lever A', and its outer ends are loosely engaged in the sleeve $b^2$ of the frame B. The outer ends of the rod $a^2$ are provided with knife-edges on the under side, which are designed to rest in saddles $b'$, thus providing a knife-edge connection between the platform-levers and the connecting-frame.

The connecting-frame B rises out of the base at one side and conforms on its outer edge to the shape of the adjacent standard C. The said frame is provided with a web $c$, and from its upper horizontal edge rises oppositely-disposed vertical supports $c'$, between which extends a square rod $c^2$. This square rod forms the means for connecting the frame with the beams. It will be observed that the frame B has a substantially broad hinged connection with the lever A', thus permitting movement of the frame back and forth in one direction only, as distinguished from the practically universal pivotal connection between the ordinary connecting-rod and the platform-lever.

The upper portion of the frame of the scale is indicated by the reference character C'', within which are located the means for elevating the connecting-block, together with the lower portion of the latter. From this case rises the standard upon which is mounted the combined rate and value beams D, D', and D². These beams are balanced, preferably, independently of the other portions of the scale by means usually employed for that purpose and have a fixed fulcrum at $d$. The rate or price beam is graduated, preferably, from "3" to "60," in a double line, and the value-beams are provided with two series of graduations to correspond with the two series of graduations on the rate-beam, and which are designed to disclose the total value of the article or commodity purchased when the price is fixed upon the rate-beam. A series of graduations showing pounds and ounces may also be made on the value-beam.

The weight coming up from the platform-levers through the connecting-frame B is applied to the rate-beam through the movable connecting-block E, the function of which latter is to fix the point of application of the weight to the beams and to determine the distance the weight is applied from the fixed fulcrum of the beam. The entire weight of this block is balanced with the connecting-frame upon which it is supported, and the combined platform-levers, connecting-frame, and connecting-block are balanced by the tare-beam H. This tare-beam is balanced upon a suitable knife-edge $h$, directly beneath and parallel with the rate and value beams and in the same vertical plane as the connecting-frame B, with which it is connected by means of the connection $h'$, as clearly shown in Figs. 1 and 2 of the accompanying drawings. The connecting-frame B is so formed that its elongated upper edge extends to the right directly over the tare-beam.

The connecting-block E consists of an upper block or poise $e$, which may be termed the "head-block" and which is provided with means for engaging the block with the serrated upper edge of the rate-beam D, preferably at the right and left extremities of the block $e$, the lower block or frame $e'$, which may be termed the "slide-block," embracing or entirely surrounding and moving freely along the rod $c^2$. A swinging link $e^2$ is provided with a knife-edge connection with the upper block $e$ and a similar connection with the block $e'$, by means of which the latter is suspended from the former. The spring-operated lever $e^3$ has a knife-edge connection with the swinging link $e^2$, there being suitable check-plates $e^4$, the latter being clearly shown in Fig. 3. To provide an antifriction connection between the rate-beam and the movable block, the small roller $e^5$ is employed, the latter being held against the under side of the rate-beam by a spring or other resilient pressure capable of giving way when the block is raised for the purpose of disengaging it from the upper edge of the rate-beam. This block is also provided with an antifriction connection or support upon the rod $c^2$ through the instrumentality of the rollers or the like $a^6$.

When the connecting-block is in position for weighing, it is loosely suspended upon the rate-beam and the weight is applied from the loose swinging link $e^2$; but when it is desired to raise the block to disengage it from the rate-beam the connecting-frame is raised, carrying with it the lower portion $e'$ of the block, until the points $e^7$ engage in the angles $e^8$. These points are beveled, and as they are raised against the block automatically they seat themselves in the angles $e^8$. This construction provides for and permits the lifting of the block squarely or conveniently and for raising both of its upper edges out of engagement with the rate-beam at the same instant and also providing for holding them out of engagement and horizontally while the block is being moved. The spring-operated lever $e^3$ when the block is raised engages with the swinging link and holds it in its vertical position ready to engage with the block again when it is lowered, and therefore provides means for perfect registry of the parts during their upper and lower movement. To operate the lever $e^3$ with a spring-pressure, the plunger $e^9$ and the spring $e^{10}$ are used. The spring-lever $e^3$ is employed primarily to prevent lost motion between the beam and the connecting-frame when the scale is balanced without a load. The plunger $e^9$ has an extension $e^{11}$, which at its lower end engages with the square rod $c^2$, serving to hold the sliding block from movement when in its normal position for weighing.

The means employed for raising the connecting-block when it is desired to move it is applied through the lifting of the connecting-frame itself and is applied to the frame through the tare-beam H. Near the right hand of the side of the machine is mounted the vertical plunger F. This plunger is provided at the lower end with an adjustable cap $f$, which is bifurcated, resulting in its arms $f^2$ embracing the upper edge of the tare-beam, and which are connected through the latter by means of the pin $f'$. The opening in the tare-beam is made considerably larger than the pin just alluded to, to provide a loose connection with the tare-beam to permit it to vibrate within a limited distance. G is a horizontal rock-shaft mounted in the frame and having a geared connection consisting of the segment 1 and segmental gear 2, both of which are fixedly secured to the shafts G and G', respectively. By means of this gear connection the counter-shaft is given an increased movement over the rock-shaft.

The counter-shaft G' is mounted in the frame in any suitable manner and is provided at one end with a pin $g^2$, the latter being eccentrically mounted in the end of the shaft and enters the horizontal channel $g^3$, formed in the side of the plunger F. By means of this peculiar connection of the counter-shaft the plunger F is caused to rise and fall, carrying with it the outer end of the tare-beam, and as the plunger and tare-beam are depressed at this end of the machine the opposite end of the tare-beam raises the connecting-frame, and with it the connecting-block.

To operate the rock-shaft, the parallel rod $G^2$ is employed and located outside of the frame and having connection with the rock-shaft at one end thereof through the frame and at the other end outside of the frame, as clearly shown in the drawings. This operating-rod extends along the outside of the frame and adjacent to the line of travel of the connecting-block. The block itself is provided on its face with a lug $e^{12}$, by means of which it is moved to the right or left. Thus the operator desiring to move the block raises up on the parallel rod $G^2$ with the hand until the block is raised through the means already described, and the same hand may be employed also for moving the connecting-block. The hand of the operator may be placed in position resting on the upper framework, so that the block may be moved with the ends of the fingers and the bar operated by the thumb, thus necessitating no change in the position of the hand in changing from one operation to the other. It will now be understood that the rock-shaft moves through a certain arc, and in view of which I have provided means for holding the shaft at either extremity of its movement. For this purpose I employ the spring $g^4$, so connected with the outer end of the shaft that the spring will hold the shaft at either extremity of its movement just stated. In other words, when the rod $G^2$ is lifted it will remain in one position, and when it is depressed by the hand and the connecting-block lowered it will likewise remain at that end of its movement, leaving the hand free to move the block. By the means thus described the scale can be quickly and easily adjusted to any desired price by the use of one hand only, leaving the other hand free to manipulate the weight of the commodity to be weighed or priced.

In Fig. 7 I illustrate as a variation means for lifting the connecting-frame and the head-block carried by it without involving the tare-beam, as above described. In this variation, as shown, I employ a rock-shaft 3, mounted in the frame and provided at each end with an arm 4. The arms 4 midway of their lengths are each provided with suitable means for engaging pivots 5, extending outward from the edges of the frame 6. 7 is a rock-shaft running parallel with the rock-shaft 3 and provided with cams 8, adapted to lift the arms 4 as the rock-shaft 7 is operated through the operating-handle 9, which is located outside of the frame. The object of this variation is to illustrate the employment of means other than the tare-beam for lifting the connecting-frame.

I desire to state at this time that both forms and arrangements herein described have already been illustrated and described in a prior application presented by me and that, therefore, the subject-matter embraced in the foregoing and in the appended claims is matter divided from my said prior application, and which latter was filed on the 26th day of January, 1899, Serial No. 703,412.

The operation of my invention is as follows: If the weight only of the article or commodity is desired, that weight is found on the tare-beam or may be found on the value-beam, if desired. In this particular my scale does not differ from the older forms or devices. If it is desired to weigh an amount to be determined by its total value, the poise-block $D^3$ is moved on the value-beam to the value fixed upon. The operator then places his hand on the rod C' and raises it to the upper extremity of its movement, elevating the connecting-block and freeing it from the rate-beam. He then moves the block to the right or left to the rate per pound of the article or commodity being weighed. The weight is then placed on the scale and added to until the scale balances in the manner common to these devices.

What I claim is—

1. The combination of a slidable connecting-block, means for lifting said connecting-block including an operating-bar extending along the line of travel of said connecting-block arranged to be raised in operating said lifting means.

2. The combination of the longitudinally-movable connecting-block, the rock-shaft, operative connection between the rock-shaft and block for lifting said block, and the parallel bar extending along the line of travel of the connecting-block from which the rock-shaft is operated.

3. In a computing-scale, a price-beam and connecting-block movable relatively to each other, in combination with means comprising a hand-bar mounted in the fixed framework and extending along in front of said beam for disengaging said beam and block preparatory to the relative movement.

4. In a computing-scale, a fixed price-beam, a connecting-block longitudinally movable thereon, means comprising an operating-bar extending along in front of said beam and mounted independently of the block, arranged to disconnect said block from said beam so that said block may be moved freely along said beam.

5. In a computing-scale, a price-beam, an adjustable connecting-block clasped thereon and arranged to be moved directly by the hand of the operator, means mounted independently of the block arranged to unclasp the block from the beam and operative connection between said means and the block.

6. In a computing-scale, a fixed price-beam, an adjustable connecting-block movable thereon, means for raising said block including an operating-bar extending along in front of said beam and so located with reference to said block that the bar and the block may each be operated directly by the hand of the operator without change of position of the hand to operate the bar; substantially as set forth.

7. In a computing-scale, a fixed price-beam, an adjustable connecting-block horizontally movable thereon and arranged to be moved directly by the hand of the operator, means for raising said block including a bar extending along in front of said beam and so located with reference to said beam that when the hand of the operator is in position to operate the block, it is also in position to operate the bar; substantially as set forth.

8. In a computing-scale, a price-beam, an adjustable connecting-block thereon, means including an operating-bar mounted in the fixed framework of the scale arranged to free said block from said beam, said bar extending along in front of said beam and so located with reference to said block that the hand of the operator may be in position to operate both the block and the bar at any position of the block; substantially as set forth.

9. In a computing-scale, a price-beam, an adjustable connecting-block thereon, means including an operating-bar extending along in front of said beam arranged to free said block from said beam for movement thereon, said bar being mounted independently of the said block and so located with reference to said block that the hand of the operator may be in position to operate both the block and the bar at any position of the block; substantially as set forth.

10. In a computing-scale, a price-beam, platform-levers, an upright frame having direct pivotal connection with one of said platform-levers at two points, and a slidable connecting element between the upper end of said frame and said beam, and means for raising and holding said frame in an elevated position having an operative part adjacent to the slidable element; substantially as set forth.

11. The combination of the slidable connecting-block and means mounted in the fixed framework for lifting said connecting-block and including a hand-operative member extending along the line of travel of the block and adapted to be operated by the hand of the operator while the hand is in position to move the said connecting-block; substantially as described.

12. In a price-scale, the combination with the platform-levers, price-beam, vertically-extending bracket pivotally connected with one of the platform-levers at two points and a shiftable head-block on said bracket adapted to coöperate with the price-beam, of a tare-beam pivoted to a fixed support outside of the bracket and extending into the bracket and connected with the same at or about its vertical center and at a point vertically intermediate the pivotal connections between the frame and the platform-levers, substantially as described.

13. In a price-scale, the bifurcated platform-levers, the price-beam, the vertically-extending open-sided bracket pivotally connected with one of the platform-levers at two points, the shiftable head-block on said frame adapted to coöperate with the price-beam, the tare-beam pivoted on a fixed support outside of the said bracket-frame and in a vertical line with the pivot of the price-beam and extending into the open-sided bracket-frame and connected with said frame at a point vertically intermediate the pivotal connections between the frame and the platform-levers, substantially as described.

14. In a price-scale, the combination of the platform-levers, the price-beam, the vertically-extending frame pivotally connected with one of the platform-levers at two points, the tare-beam pivotally connected to said frame, the head-block connecting said frame and price-beam consisting of a slidable member on said frame, a slidable member on said price-beam and a pivoted link connecting said slidable members and means located adjacent to the head-block for lifting the vertically-extending frame to disengage the head-block from the beam, substantially as described.

15. In a price-scale, the frame consisting of the base, the standards hangers and the cap, the price-beam above the cap, the tare-beam pivoted on hangers below the cap and extending through the standard in one direction, the platform-levers, a vertically-extending frame pivoted to one of the platform-levers at two points and located in the space to one side of the tare-beam hangers, a link connecting the vertically-extending frame and the tare-beam, and a shiftable head-block connecting the frame and price-beam, substantially as described.

16. In a price-scale, the frame consisting of the base standards hangers and cap, the price-beam located above the cap, the tare-beam pivoted on the hangers below the cap and having its long arm extending through the standard, the platform-levers, the vertically-extending frame pivoted to one of the platform-levers at two points and formed to partially surround the short arm of the tare-beam, a link connecting the vertically-extending frame and the short arm of the tare-beam and the shiftable head-block connecting the frame and the price-beam, substantially as described.

17. In a price-scale, the frame consisting of the base standards and cap, hangers depending from the cap, the platform-levers, the price-beam above the cap, the vertically-extending frame pivotally connected with one of the platform-levers at two points, a tare-beam exterior to the frame and pivoted to the hangers of the cap, said tare-beam pivotally connected to the vertically-extending frame above and in a vertical line with a point midway between the two pivots connecting the frame with the platform-lever, substantially as described.

In testimony whereof I sign this specification in the presence of two witnesses.

FRANCIS C. OSBORN.

Witnesses:
S. J. WILSON,
S. E. THOMAS.